US006800318B2

(12) United States Patent
Kapila et al.

(10) Patent No.: US 6,800,318 B2
(45) Date of Patent: Oct. 5, 2004

(54) SOLVENT AND METHOD FOR EXTRACTION OF TRIGLYCERIDE RICH OIL

(75) Inventors: Shubhen Kapila, Rolla, MO (US); Paul K. S. Nam, Rolla, MO (US); Virgil J. Flanigan, Rolla, MO (US)

(73) Assignee: University of Missouri Board of Curators, Columbia, MO (US)

( * ) Notice: Subject to any disclaimer, the term of this patent is extended or adjusted under 35 U.S.C. 154(b) by 0 days.

(21) Appl. No.: 10/081,319

(22) Filed: Feb. 21, 2002

(65) Prior Publication Data

US 2002/0121628 A1 Sep. 5, 2002

Related U.S. Application Data

(62) Division of application No. 09/491,185, filed on Jan. 25, 2000, now Pat. No. 6,547,987.

(51) Int. Cl.[7] .............................. A23L 1/28; B01F 1/00

(52) U.S. Cl. ....................... 426/430; 426/425; 426/429; 252/364; 554/14

(58) Field of Search .......................... 252/364; 426/425, 426/429, 430; 510/412; 554/14

(56) References Cited

U.S. PATENT DOCUMENTS 2,615,905 A 10/1952 Forstmann et al.
2,735,624 A 7/1956 Beck
3,150,050 A 9/1964 Safrin et al.
3,261,690 A 7/1966 Wayne
3,268,335 A 8/1966 Circle et al.
4,008,210 A 2/1977 Steele et al. ............ 426/430 X
4,059,604 A * 11/1977 Kresse
4,118,521 A * 10/1978 Cazenave ............... 426/430 X
4,221,731 A * 9/1980 Short et al.
4,255,346 A 3/1981 Kock
4,279,664 A 7/1981 Figeil et al. .................. 134/38
4,331,695 A 5/1982 Zosel ......................... 426/430
4,453,832 A 6/1984 Schumacher et al. ....... 366/167
4,675,133 A 6/1987 Eggers et al.
4,808,331 A 2/1989 Burt et al. ................ 134/40 X
4,954,290 A 9/1990 Bartlett et al. ............ 134/38 X
5,118,438 A 6/1992 Magid et al. ............. 134/38 X
5,227,088 A 7/1993 Swan et al. ............... 134/38 X
5,278,325 A 1/1994 Strop et al. ................... 554/12
5,431,837 A 7/1995 Matsuhisa et al.
6,224,847 B1 * 5/2001 Powell et al. ........... 426/430 X
6,547,987 B1 * 4/2003 Kapila et al. ............... 252/364

* cited by examiner

*Primary Examiner*—Daniel S. Metzmaier
(74) *Attorney, Agent, or Firm*—Lathrop & Gage L.C.

(57) ABSTRACT

The present invention relates to a solvent for use in extracting oil from an oil bearing material, such as soybeans, with the solvent resulting in the selective extraction of a triglyceride rich oil, which contains 95% or greater triglycerides and non-polar constituents, with the solvent comprised of a hydrocarbon, preferably hexane, and a fluorocarbon, so that the solvent has a viscosity less than 2.6 centipoise and a polarity of less than 0.1. The present invention also relates to a method of using the solvent to extract the triglyceride rich oil, with the method including preferably extracting the oil at a temperature ranging between 35° C. and 55° C., and then preferably cooling resulting miscella to a temperature ranging between 15° C. and 25° C.

14 Claims, 3 Drawing Sheets

SOLVENT AND METHOD FOR EXTRACTION OF TRIGLYCERIDE RICH OIL

CROSS REFERENCE TO RELATED APPLICATION

This application is a divisional application which claims the priority of prior application Ser. No. 09/491,185 (now U.S. Pat. No. 6,547,987), entitled "Solvent and Method for Extraction of Triglyceride Rich Oil", filed Jan. 25, 2000.

FIELD OF INVENTION

The present invention relates to a method and solvent for use in extracting oil from oil bearing materials, preferably a triglyceride rich oil is selectively extracted from the oil bearing material. More preferably, the present invention relates to a solvent, comprised of a hydrocarbon and a fluorocarbon, and a method that will preferably remove an amount of oil comprised of greater than 95% by weight triglycerides and other non-polar constituents from an oil bearing material, such as a soybean material.

BACKGROUND OF INVENTION

Oils, especially oils comprised primarily of triglycerides and other non-polar constituents, are used in a variety of applications including uses as edible and non-edible oils. Edible oils that high in triglycerides are especially desired and are typically used as food ingredients or as medium for frying or cooking foods. Triglyceride rich edible oils are preferred for use because they have a high smoke temperature, meaning they do not readily smoke or burn when heated, making them ideal for frying or cooking, and have a desirable flavor. It should be pointed out that most edible oils sold in grocery stores are primarily comprised of triglycerides. Non-edible oils include technical oils such as lubricating oils and hydraulic fluids and fuel.

There are a variety of sources available for use in extracting oils which are high in triglycerides. Some of the available raw material sources include: soybeans, corn, sunflower, palm, cotton seed, olives, peanuts, linseed, and coconut. Additionally, there are other types of vegetable and animal matter which can be used to extract oil that is high in triglycerides. Regardless of the source of the oil, it is generally preferred that the extracted oil be devoid of unsaponifiable matter, pigments, phospholipids or phosphatides, and odoriferous components. This is especially true if the oil is going to be used for cooking or edible oil purposes. Unfortunately, most known methods for extracting oil from oil bearing materials initially result in an oil which contains these unwanted components. As such, it is often necessary to pass the extracted oil through a number of refining steps to ensure adequate removal of the odoriferous components, phospholipids, and pigments. Additional refining steps, however, are undesirable because additional steps generally raise the cost associated with producing both edible and non-edible oils. Increased energy inputs are required and often more equipment is necessary. For these reasons, it is desired to have a more cost efficient and less energy intensive method which most likely requires fewer steps for removing oils rich in triglycerides from oil bearing materials.

Of particular interest is an oil rich in triglycerides derived or extracted from soybeans. It is known that soybean oils are especially prevalent for use in cooking and, in general, are desired for use as an edible oil. Soybean oils are especially well known for use in frying foods. Before selling soybean oil commercially for use in cooking, it is necessary to ensure that the phospholipid, color, and odoriferous constituents are removed, otherwise consumers will consider the product undesirable for consumption and cooking uses. This is especially true if the oil has a disagreeable smell as a result of the odoriferous compounds. For this reason, it is especially desired to have a more efficient, less energy intensive method for extracting triglyceride rich soybean oil from soybean material.

Traditionally, soybeans and other oil bearing materials have had oils extracted by a general method which includes preparation of the oil bearing material, extraction of the oil from the oil bearing material with an organic solvent, separation of the solvent from the oil, and removal of polar materials, including phospholipids, pigments, odor, and color constituents from the oil. This is generally followed by a solvent neutralization step. It is known that in this general process, the step for removal of the polar materials, such as the phospholipids, pigments, and odoriferous constituents, and the solvent neutralization step can add costs and result in increased energy inputs. What is greatly desired is a method that allows for extraction of a triglyceride rich oil from an oil bearing material, especially soybeans, that does not initially remove the phospholipids, pigments, or odoriferous compounds with the triglyceride rich oil. It is also desired if a solvent neutralization step is not required. In other words, it is greatly desired to have a solvent and/or a method that selectively extracts triglycerides from the oil bearing material and that does not result in the extraction of the odoriferous compounds, color constituents, and phospholipids with the triglycerides.

A number of processes exist for extracting oils from oil bearing material; however, a vast majority of these known methods are disadvantageous for one reason or another. For example, it is well-known in the extraction art to use hexane to extract triglyceride rich oil from oil bearing materials. This, however, suffers from two problems. First, the extracted oil contains a sufficient amount of phospholipids, odoriferous components, and color components so as to warrant additional steps necessary to remove these constituents. Hexanes alone do not selectively extract triglyceride rich oil. This, in turn, increases the amount of energy and number of pieces of equipment required to separate the oil from the oil bearing material and, as such, increases the cost. The second problem is that hexanes are highly flammable and has been known to combust and cause plant explosions. However, the majority of soy oil extraction methods use hexane, because hexanes have a low viscosity and most oil components are miscible in hexane. As such, it is desired to have a method and/or solvent that preferably includes the use of hexane for removing the oil from the oil bearing materials which does not require an additional removal step for the color, odor, and phospholipid constituents, and which is non-flammable or, more particularly, less hazardous to human health.

It is further desired to be able to extract the oil in conditions that are close to ambient. It is even more preferred to be able to separate the oil from the solvent at ambient or near ambient conditions. This is desired because of the lesser energy input required. Currently, many removal processes include a distillation step designed to separate the solvent from the oil. As such, it is especially desired to eliminate or reduce the need for a distillation step from the oil extraction method.

It has been known to use a mixture of solvents, including hydrocarbons and halogenated hydrocarbons, to extract oil from an oil bearing material. It is believed that the known solvent mixtures typically have a higher polarity than the oil. The use of a higher polarity solvent appears to have developed into the preferred way for extracting oils from oil bearing material. In general, it appears that the art has taught away from lowering the polarity of the solvent to produce a solvent having a polarity of about 0 or less than that of the oil. Instead, the art, as observed by currently practiced methods, has apparently taught that the highly non-polar solvents are not suitable for extracting non-polar triglycerides.

In U.S. Pat. No. 4,008,210, invented by Steele, et al., a potential use of a mixed solvent is disclosed. Specifically, the method disclosed in the Steele patent relates to the formation of a proteinaceous material that is devoid of oil components, with the method unrelated to the selective extraction of triglycerides. Importantly, the method does not disclose how to selectively extract a triglyceride rich oil from an oil bearing composition. Further, this patent does not disclose the specific requirements for a solvent that will selectively extract triglycerides from oil bearing materials at near ambient conditions.

Thus, it is desired to have a substantially safe, nonhazardous solvent and/or method for selectively extracting triglycerides from oil bearing materials, especially soybeans, that requires very little energy input and that, in particular, can be conducted at near ambient conditions. It is especially desired to have a method and/or solvent that results in the selective extraction of oil that is preferably comprised of 95% or greater triglycerides and non-polar constituents, and even more preferably, comprised of 99% or more triglycerides so that phospholipid, color, and odoriferous constituents do not have to be separated from the oil after removal of the solvent.

SUMMARY OF INVENTION

The present invention relates to a solvent which can be used in the extraction of oil from oil bearing materials. Preferably, the solvent will result in the selective extraction of an oil comprised of at least 95% by weight non-polar constituents. Even more preferred is for the solvent to selectively extract an oil comprised of greater than 99% by weight non-polar constituents, including triglycerides. Additionally, a method can be used with the present solvent to extract the oil from the oil bearing material.

Besides resulting in a selective extraction, the solvent will have a sufficiently low viscosity so as to allow it to readily pass over or through the oil bearing material. In particular, the solvent will not have a viscosity such that the viscosity is a rate limiting factor in the extraction of the oil from the oil bearing material. With this in mind, it is preferred for the solvent to have a viscosity equal to or less than about 2.6 centipoise. Further, because it is desired to extract an oil comprised primarily of non-polar constituents, it is necessary for the solvent to have a polarity that is equal to or less than the non-polar constituents. In particular, the polarity should be equal to or less than the polarity of the triglycerides which primarily comprise the oil. As such, it is preferred for the solvent to have a polarity that is equal to or less than 0.1. Additionally, the solvent is relatively non-flammable, has a low toxicity or is not overly hazardous to human health, and does not result in causation of significant ozone depletion.

Any of a variety of constituents can be used to form the solvent; however, it has been found that a solvent having the above characteristics can be formed by combining or mixing an organic halide or non-polar halogenated solvent, generally a fluorocarbon, with a low molecular weight hydrocarbon. Preferably, the hydrocarbon will be of the formula $C_nH_{(2n+2)}$, or $C_nH_{2n}$ and 3, with n equal to between 5 and 8. Even more preferred is for the hydrocarbon to be a hexane.

The fluorocarbon is preferably selected from the group consisting of hydrofluorocarbon, perfluorocarbon, chlorofluorocarbon, hydrochlorofluorocarbon, hydrochlorocarbon, and combinations thereof. More preferably, the fluorocarbon will be a hydrofluorocarbon, a perfluorocarbon, or a hydrochlorofluorocarbon. Hydrofluorocarbon is presently the most preferred fluorocarbon for use with the hydrocarbon. The fluorocarbon constituents that are desired are non-hazardous, non-flammable, have a polarity of less than 0.1, and can be used to form a solvent that will selectively extract an oil that is rich in triglycerides and other non-polar constituents. Also, the selected fluorocarbon should have a boiling point below the boiling point of a triglyceride but above ambient temperatures. Obviously, other fluorocarbon constituents can be used, however, they may suffer from being hazardous, for example. The hydrocarbon and fluorocarbon can be mixed together in any of a variety of amounts so long as the mixture of constituents results in a solvent that has a viscosity of less than 2.6 centipoise and a polarity less than about 0.1. When a hydrocarbon, such as hexane, is mixed with a fluorinated hydrocarbon, or fluorocarbon, such as decafluoropentane, the fluorinated hydrocarbon will typically comprise about 65% by volume of the solvent.

As mentioned, the solvent can be used as part of a method to extract oil from oil bearing materials, with the method initiated by preparing the oil bearing materials for extraction. The preparation begins by making sure that the oil bearing materials are of a sufficient size so as to expose as much as possible of the surface area of the oil bearing materials to the solvent without clogging the device used to expose the oil bearing materials to the solvent. After preparation of the oil bearing materials, the method involves exposing such materials to the solvent. It should be noted, that the temperature in which the oil is extracted from the oil bearing materials should range between about 35° C. and about 55° C. Such a temperature will result in the oil being miscible in the solvent. This is preferably done in a device that causes the solvent and oil bearing materials to move counter to one another so that there is sufficient contact between the solvent and the oil bearing materials. Once sufficient contact has been made between the solvent and the oil bearing materials, a solvent and oil mixture will be formed, also known as a miscella. It is then preferred to separate the solvent and oil mixture from the oil bearing materials.

After separation of the oil and solvent mixture, or miscella, from the oil bearing materials, it is necessary to then cool the miscella to a temperature ranging between about 15° C. and about 25° C. so as to cause formation of two distinct layers. The oil can then be easily separated from the solvent so that an oil is formed which is nonhazardous to human health and is ready for immediate use as an edible oil. The separated oil is comprised of greater than 95% by weight non-polar constituents.

The present invention is advantageous for a number of reasons. First, the present invention requires a comparatively lesser amount of energy input than other known methods, meaning the present solvent and method result in a comparatively cheaper extraction of oil. Additionally, the present invention is advantageous because a selective extraction occurs which eliminates the need for additional refining steps designed to remove polar constituents, including unwanted constituents such as odoriferous compounds, color components, and phospholipids. A further advantage is that the present invention is easily performed, meaning application takes a lesser amount of time and energy than what is believed to be involved in other oil extraction methods. Yet another advantage is that the solvent and method are comparatively safe for human use and are non-hazardous. Advantageously, the solvent and method result in the extraction of greater than 15%, preferably 20%, of the total soybean material, which is comparable to other presently used methods for extracting oil from oil bearing materials.

DETAILED DISCLOSURE

The present invention relates to a solvent for extracting oil from oil bearing material, especially soybeans, and a method used in association with the solvent. The use of the solvent will result in a selective extraction that removes a majority of available oil from the oil bearing material, with the oil comprised of greater than 95% by weight triglycerides and other non-polar constituents. Even more preferred, the use of the solvent will result in a selective extraction of an oil comprised of greater than 99% by weight triglycerides and other non-polar constituents. It is preferred to use the method in association with the solvent, as this is believed to increase the efficiency with which the finished oil product is obtained. Importantly, the oil will contain negligible amounts of polar constituents, specifically, color, odor, and phospholipid constituents, meaning that the oil will generally not require further processing to remove such constituents.

The solvent used in the present method is unique, especially for use in extracting oil, with the solvent having a polarity equal to or less than about 0, a viscosity equal to less than 2.6 centipoise, and a dielectric constant equal to about 2. The solvent must be less polar than the triglycerides or non-polar constituents found in the oil. Also, the solvent will typically have a polarity that is close to the triglyceride component. Preferably, the solvent should be of a low toxicity, substantially non-flammable, of a high solvent strength, have a rapid penetration rate, easily separable from the miscella, and of a low specific heat. Importantly, when the solvent is contacted with an oil bearing material, especially prepared soybeans, triglycerides will be miscible in the solvent, preferably at a temperature ranging between about 35° C. and about 55° C. After extraction of the oil from the oil bearing material, a solvent and oil mixture (a miscella) will be formed that can then be cooled, preferably to a temperature ranging between 15° C and about 25° C. to thereby form a distinct oil layer and solvent layer. The triglyceride rich oil can then be easily separated from the solvent and be ready for commercial, specifically edible oil, food applications. The solvent is comprised of a hydrocarbon constituent and a non-polar fluorocarbon constituent, more preferably, a decafluoropentane.

Figure 3:
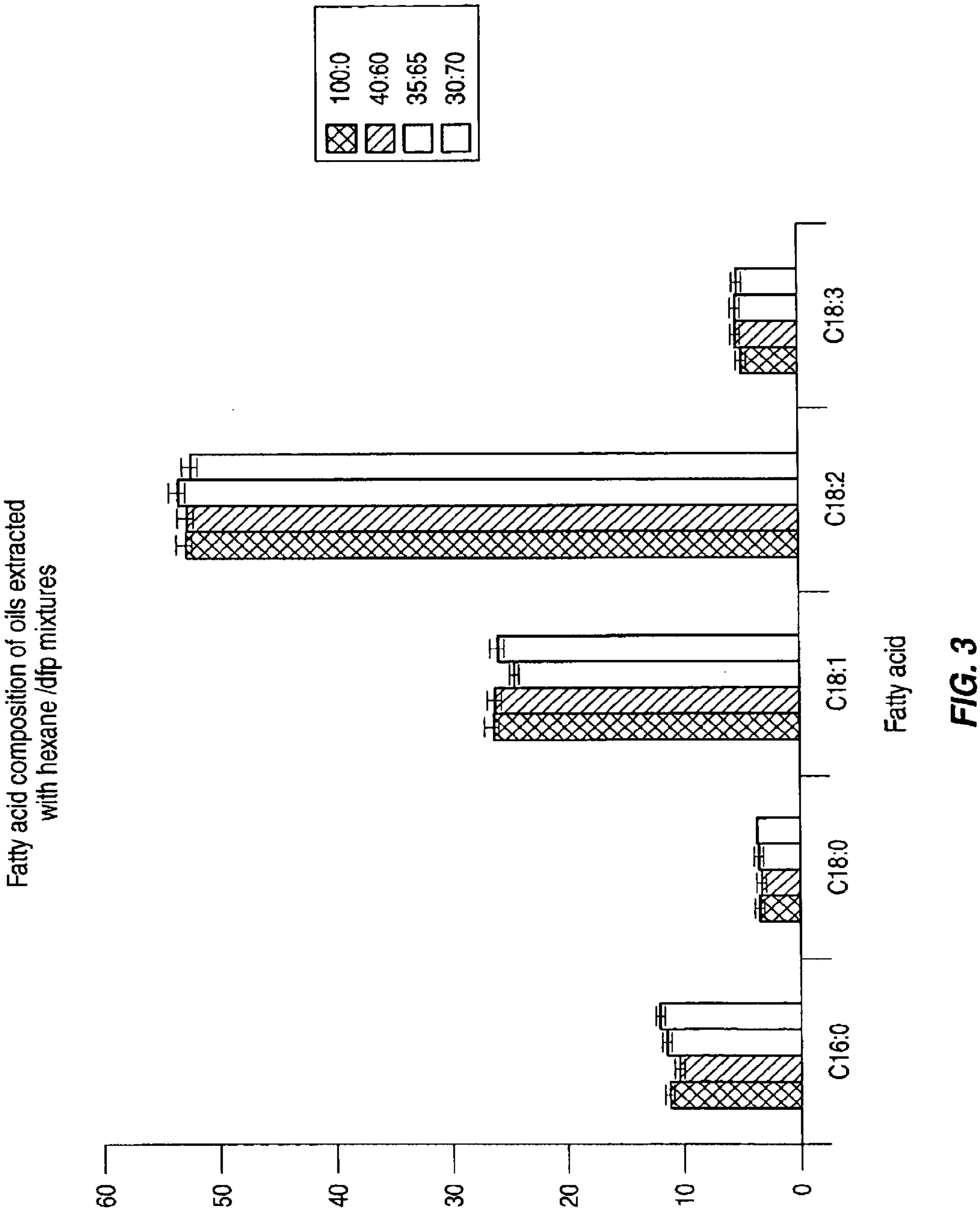

The solvent and method will preferably result in the selective extraction of non-polar constituents found in the oil. The non-polar constituents will include esters of a fatty acid and glycerol, generally triglycerides of the formula [$CH_2(OOCR_1)$ $CH(OOCR_2)$ $CH_2(OOCR_3)$], where, $R_1$, $R_2$, and $R_3$ generally equal hydrocarbon chains of different lengths. Preferably, the hydrocarbon chains are 15 or 17 carbons in length. An exemplary percentage of fatty acids of different chain lengths that comprise the extracted oil are shown in FIG. 3. Among the specific triglycerides extracted with the solvent and/or method are tristearins, trioleins, and trilinoleins.

The method can be initiated by either treating an oil bearing material so as to prepare it for extraction with the solvent or by obtaining an already treated oil bearing material that is suitable for extraction with the solvent. If beans are the preferred oil bearing material, then to prepare the beans, it is either typically necessary to dry, crack, dehydrate, and flake the beans or extrude the beans. When the oil bearing material is treated, it is preferred that the material have a certain particle size that is conducive to extraction with a solvent. The oil bearing material should have a particle size that is suited for easy extraction with a solvent. This means that the particle size and shape should be such that as much as possible of the surface area of the material is exposed to the solvent and that the solvent will readily pass through or over the oil bearing material. Further, the material should not be so small that the solvent and oil bearing material will clog the device in which the solvent and oil bearing material are contacted with one another. Another problem with particles that are too small is that solvent will be more readily retained on the particles. Thus, it is desired that the oil bearing material have a particle size that is conducive to rapid extraction of the oil from the oil bearing material without having a size that interferes with the separation of the oil and solvent mixture from the oil bearing material. It should be mentioned that when extracting oil from a soybean starting material, it is most preferred for the soybeans to be flaked so that they are elongated thin wafers, for example the beans are flaked to have a length of approximately 10 millimeters ("mm") and a thickness of less than approximately 1 mm. Regardless of the oil bearing material, it is preferred for the material to be treated so that it is a thin flake, meaning dimensioned to have a greater length than thickness.

Any of a variety of starting materials can be extracted with the present solvent. In general, any oil bearing material that specifically contains an amount of triglycerides can be extracted with the present method and/or solvent. As such, this will generally include any animal or vegetable matter that contains an amount of oil that is in turn comprised of triglycerides. Among the preferred oil bearing materials are soybeans, corn, cotton seed, olives, peanuts, linseed, coconuts, sunflower seeds, sesame seeds, flax, and any other oil bearing vegetable matter. It is most preferred to extract the triglyceride rich oil from a soybean starting material, as soybean oil is a preferred edible oil for use in the food industry. Soybean oil extraction is also preferred because soybeans are readily available and economical for use.

Once a suitable oil bearing material has been obtained, the oil bearing material will be placed in a device suitable for contacting the oil bearing materials with the solvent. This extraction step can be accomplished by using any of a variety of immersion type or percolation type extractors. Essentially, any device can be used that will sufficiently contact the solvent with the oil bearing material and allow for sufficient separation of the oil from the oil bearing material, followed by sufficient separation of the solvent and oil mixture from the oil bearing material.

Among the specific types of suitable extractors are: rotary bed extractors, deep bed extractors, carousel extractors, horizontal belt extractors, continuous loop extractors, percolation type extractors, screw type extractors, and auger type continuous extractors. It is most preferred to use a screw type extractor that will allow the oil bearing material and solvent to move counter to one another so that the solvent washes over the oil bearing material and extracts the oil. Any of a variety of screw type extractors can be used and, additionally, more than one screw type extractor can be used so that the oil bearing material is exposed to multiple washings with the solvent. Preferably, the extraction allows the miscella to gravimetrically drain away from the oil bearing material.

The number of screw type extractors or other types of extractors used will be, in part, dependent upon the contact time between the solvent and oil bearing material, which is often influenced, for example, by the length of the screw type extractor. Also, whether any agitation is used in association with the extractor will influence the contact time, and number and size of extractors used. Agitation is preferred because it typically increases the rate at which the oil is extracted by the solvent from the oil bearing material. Any extractor can be used as long as there is sufficient contact time between the solvent and the oil bearing material to ensure adequate removal of the oil.

Figure 1:
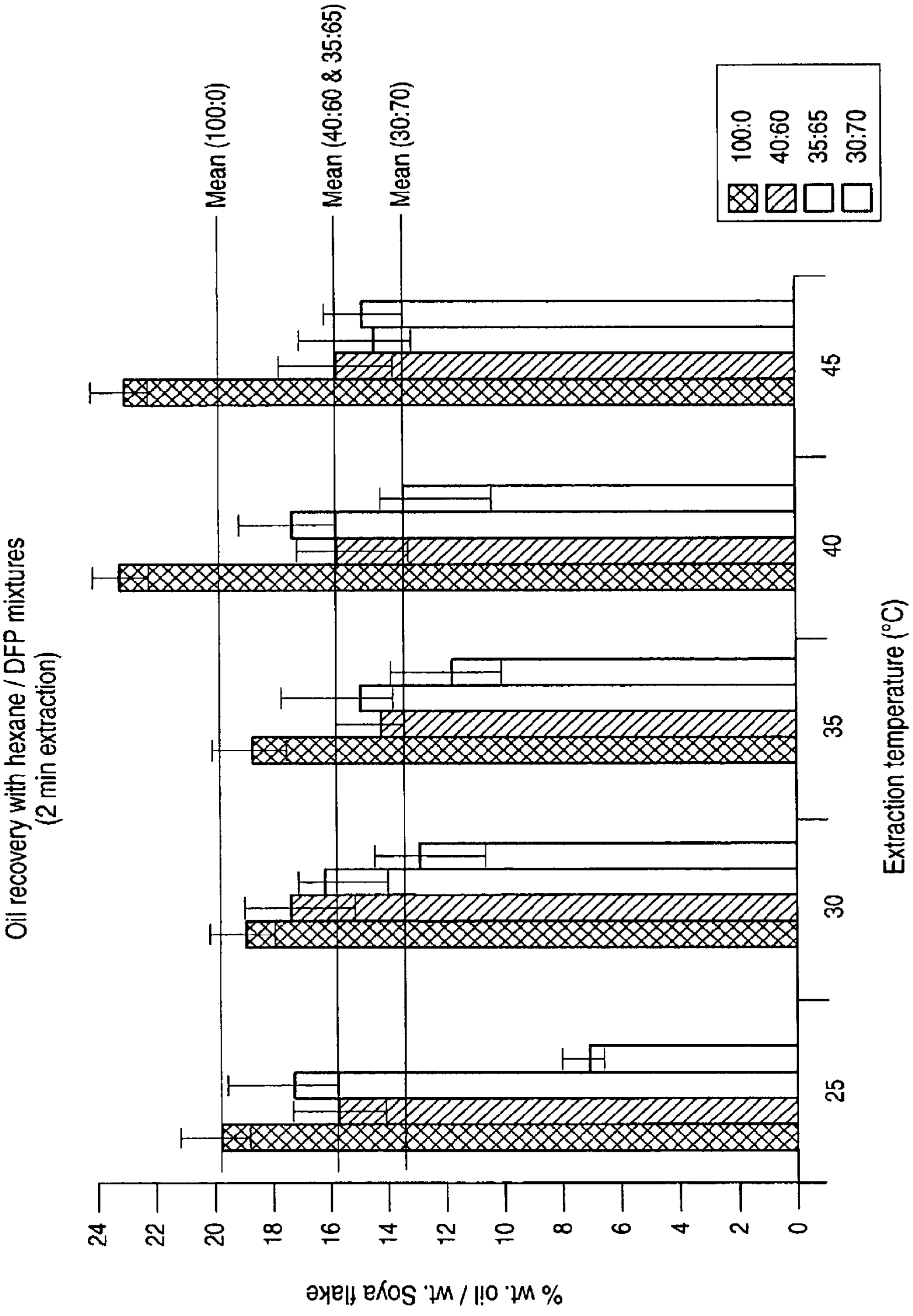
FIG. 1 shows the percentage of oil recovered from soy flakes using a hexane and fluorocarbon solvent at different temperatures.
Figure 2:
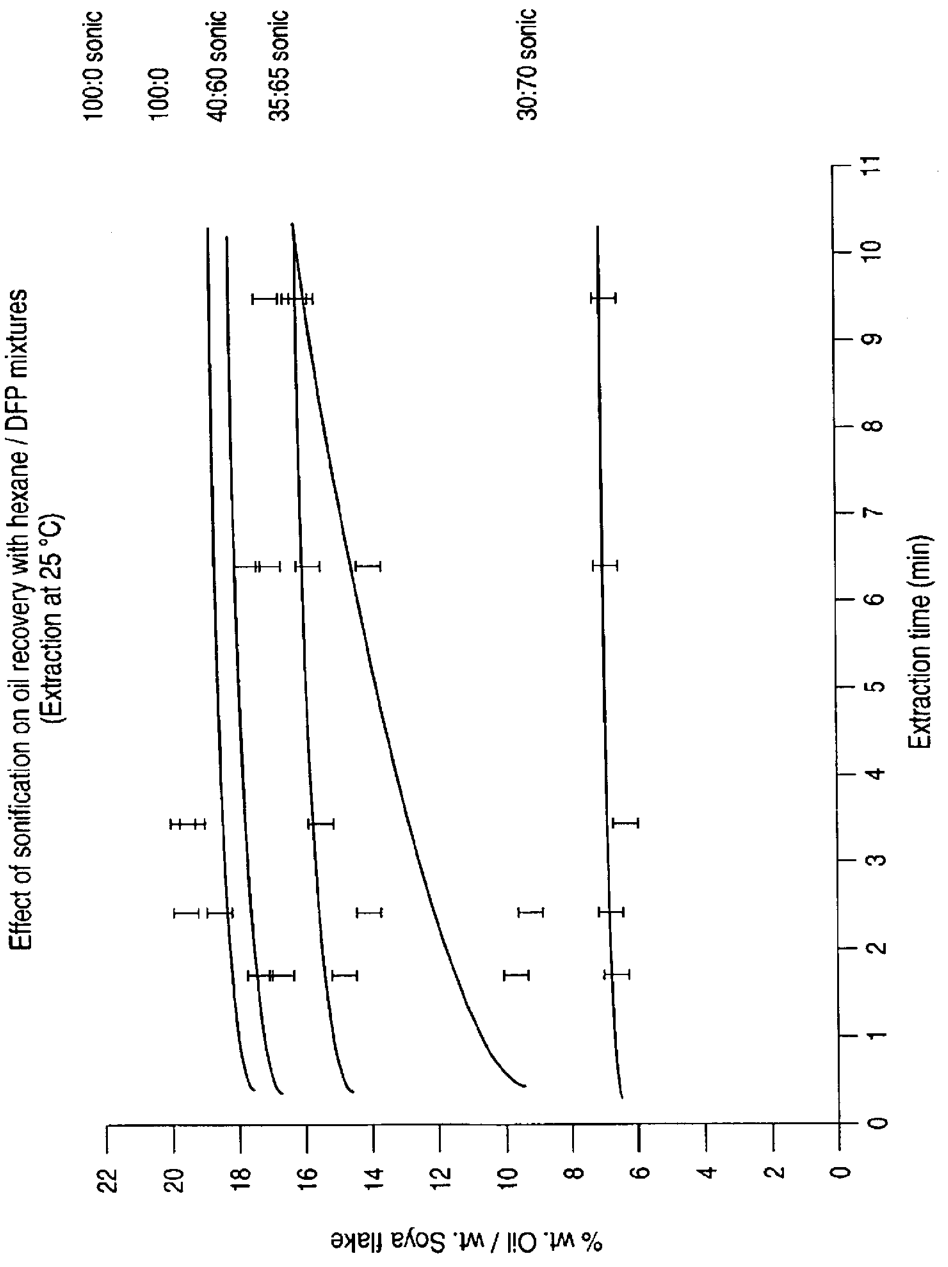
FIG. 2 shows the percentage of oil recovered from soy flakes using a hexane and fluorocarbon solvent at a temperature of 25° C., which is sonicated; and, FIG. 3 shows the percentage of different fatty acids found in an oil extracted with the hexane and fluorocarbon solvent.

A preferred pilot system includes a pair of attached screw type extractors that have a housing that is approximately 10 feet long and a diameter of about 6 inches. Preferably, an auger within the housing of the extractor will rotate at a speed ranging between 0.5 rpm and 5 rpm. Any speed is permissible so long as there is sufficient contact between the solvent and the oil bearing material. It additionally is preferred for the screw type extractor to be set at an angle ranging between about 10° and about 30°. This is desired because the angle will provide for an optimal contact time between the solvent and the oil bearing material, and a desired solvent drainage rate. The extractors are attached so that the oil bearing material will be exposed to two or more washings with the solvent, which can be a washing with a new non-oil containing solvent each time or repeated washings with the same oil containing solvent. Most importantly, it is necessary to maintain the temperature of the extraction at a range sufficient to extract the oil and cause the oil to be miscible in the solvent. Preferably, the extraction is conducted at a temperature ranging between about 35° C. and about 55° C. Regardless of the specific type of extractor used, it is preferred for the solvent to be added and maintained at this temperature range. When extracting oil from soybean material, it is preferred to extract at least approximately 15% and, more preferably, 20% of the total soybean material. An exemplary percentage of extracted oil is shown in FIG. 1. The percentage extracted increases with agitation, as shown in FIG. 2.

The solvent used to extract the oil from the oil bearing material will desirably have a polarity equal to or less than about 0, and, at the very least, a polarity less than a triglyceride. The solvent will preferably have a dielectric constant equal to about 2.0. Additionally, the solvent should have a low viscosity so that the solvent does not become a rate limiting factor in the extraction of the oil from the oil bearing material. As such, it is preferred for the solvent to have a viscosity ranging between about 0.3 and about 2.6 centipoise at 20° C. Preferably, the solvent has a viscosity ranging between about 0.3 and about 1.0 centipoise at 20° C. The solvent should cause the triglycerides and other non-polar constituents found in the oil, derived from the oil bearing material, to be miscible at a preferred temperature ranging between about 35° C. and about 55° C. Thus, the solvent should selectively extract triglycerides and, if desired, other non-polar constituents. After extraction of the oil, the miscella should be cooled to a temperature sufficient to form two distinct layers, an oil layer and a solvent layer. The preferred temperature for this will range between about 15° C. and about 25° C. Thus, it is important for the solvent to have a polarity equal to about zero and a viscosity equal to between about 0.3 and 2.6 centipoise. It is even more important for the solvent to be immiscible and form distinct layers at a temperature close to ambient or at a temperature other than that required to make the oil miscible. The solvent should also be relatively non-flammable and non-hazardous.

Preferably, the solvent will be comprised of a hydrocarbon constituent and a fluorocarbon species constituent. The hydrocarbon constituent will preferably be a low molecular weight hydrocarbon, as the lower the molecular weight will in turn cause the finished solvent to have a lower viscosity. If the molecular weight of the hydrocarbon is too high, it will cause mass transfer problems as the finished solvent will be too viscous and will not allow for adequate removal of oil. The hydrocarbon can be selected from the group consisting of $C_nH_{(2n+2)}$, and $C_nH_{2n}$, with n equal to between 5 and 8. Additionally, the hydrocarbon can be straight chained, branch chained, cyclic, or a combination thereof. The most preferred hydrocarbon for use is hexane $[(CH_3(CH_2)_4CH_3)]$, with either straight chain hexanes, branch chained hexanes, or combinations thereof suitable for the preferred use. Hexanes are preferred because they are readily available, typically used in the industry, and readily result in the separation of oil from oil bearing materials, as the hexane has a polarity similar to the oil. Other hydrocarbons can be used so long as they result in the extraction of oil, can be easily separated from the oil, and are not overly detrimental to human health.

Non-polar halogenated hydrocarbons, preferably fluorocarbons, are preferred to be mixed with the hydrocarbons to form the solvent. The fluorocarbon solvent is selected from the group consisting of hydrofluorocarbon, $C_nH_{(2n+2)-x}F_x$, where n equals between 4–8 and x equals between 1–17; perfluorocarbon, $C_nF_{(2n+2)}$, where n equals between 5–8; chlorofluorocarbon, $C_nCl_{(2n+2)-x}F_x$, where n equals between 1–6 and x equals between 1–13; hydrochlorofluorocarbon, $C_nH_{(2n+2)-(x+f)}Cl_xF_f$, where n equals between 1–4, x equals between 1–9, and f equals between 1–9; and, hydrochlorocarbon $C_nH_{(2n+2)-x}Cl_x$, where n equals between 1–4, and x equals between 1–9. The fluorocarbon solvent is preferably selected from the group consisting of: $C_5H_5F_{10}$, $C_6HF_{13}$, $C_7HF_{15}$, $C_{10}HF_{21}$, $C_8H_8F$, $C_5F_{12}$, $C_7F_{16}$, $C_6F_{14}$, $C_8F_{18}$, $C_2Cl_3F_3$, $CCl_3F$, $C_3Cl_2F_6$, $C_4Cl_2F_8$, $C_4Cl_3F_7$, $C_6ClF_{13}$, $C_3HCl_2F_5$, $C_2HCl_2F_3$, $CH_2Cl_2$, $C_2H_3Cl_3$, and $C_2HCl_3$. It is more preferred for the fluorocarbon to be selected from the group including hydrofluorocarbon, perfluorocarbon, and hydrochlorofluorocarbon because these constituents are generally non-hazardous or non-carcinogens and, typically, do not have an adverse effect on the ozone layer. The most preferred fluorocarbon constituents are hydrofluorocarbons, in particular, decafluoropentane ($C_5H_2F_{10}$). The fluorocarbon solvent is equal to between 60% and 70% by volume of said solvent. As such, the most preferred fluorocarbon constituents are non-toxic and less damaging to the environment than other halogenated hydrocarbons, such as chlorofluorocarbons. Typically, the preferred fluorocarbon constituents do not readily cause ozone depletion. Also, the preferred fluorocarbon constituents can be used to produce a solvent that will have the desired characteristics of the solvent of the present invention.

Desirable amounts of the hydrocarbon and the fluorocarbon species can be mixed to form the solvent as long as the solvent has a sufficient polarity and viscosity. The amount of hydrocarbon and fluorocarbon species mixed together will be, in part, dependent upon the specific hydrocarbons and fluorocarbon species chosen for formation of the solvent, as each individual constituent will have slightly different properties, in terms of viscosity and polarity. Thus, the optimal amount of each constituent will be based upon the finished characteristics of the solvent. However, if a hexane and a fluorocarbon are mixed together, it is generally preferred for the solvent to be comprised of an amount of fluorocarbon equal to between about 60% and about 70% by volume of the solvent.

The extraction solvent is made by mixing the fluorocarbon, preferably hydrofluorocarbon, with the hydrocarbon, preferably hexane, at room temperature (25° C.). Most preferred, is for the solvent to be comprised of between 30% to 40% by volume hexane, with the hexane and the decafluoropentane mixed together at room temperature to form a desired solvent.

To arrive at a suitable polarity for the solvent, the polarity of both the hydrocarbon and the fluorocarbon species must be taken into account. A suitable solvent polarity can be derived using the following formula:

$$P'_{ab}=\phi_a P'_a+\phi_b P'_b$$

whereby $P'_{ab}$ equals the polarity index of the solvent blend, $P'_a$ equals the polarity index of solvent a, $P'_b$ equals the polarity index of solvent b, $\phi_a$ equals the volume fraction of solvent a, and $\phi_b$ equals the volume fraction of solvent b. $P'_{ab}$ should be equal to or less than 0.

Generally, the solvent, dependent upon whether there is agitation, will be exposed to the oil bearing material for a time ranging between about 30 seconds and about 5 minutes, as this is typically sufficient to remove a majority of the available oil found in the oil bearing material. Specifically, the oil bearing material will be immersed in the solvent for between 5 seconds and two (2) minutes. The remaining time that follows will be directed to percolating or causing agitation of the oil contacted with the oil bearing material to cause separation. The amount of exposure time will be influenced by how much available oil is desired for extraction. Increased exposure time will generally result in an increased amount of extracted available oil, with the efficiency of the extraction typically decreasing with time. Agitation will typically lessen the amount of time required to extract the oil. The effect of agitation or sonication is shown in FIG. 2. The solvent should be added to the oil in an amount equal to between three to five parts by weight of solvent, to one part by weight oil bearing material (3/5:1). The extraction should occur at a temperature ranging between about 35° C. and about 55° C.

Once the solvent has been exposed to the oil bearing material, a solvent and oil mixture will be formed. As such, it will be necessary to separate the oil and solvent mixture from the oil bearing material. This is accomplished, for example, by gravimetrically draining the solvent away from the oil bearing material. Once the solvent and oil mixture has been separated from the oil bearing material, it is typically necessary to cool the miscella to a temperature ranging between about 15° C. and about 25° C. Cooling the miscella to this temperature range will cause formation of distinct oil and solvent layers. More particularly, cooling the miscella causes a reduction in oil solubility. This temperature range can vary, dependent upon the characteristics of the constituents used to form the solvent. Regardless, it is desired to form the distinct layers by simply cooling the oil and solvent mixture with it preferred that the cooling step requires little energy input. The separated miscella will be comprised of two distinct layers, one layer comprised of the solvent and the other layer comprised of the oil, which is comprised of at least 95% by weight triglycerides and non-polar constituents and, more preferably, 99% by weight triglycerides. It is then desired to separate the two layers so that the solvent may be again used, if desired, for extraction of oil from oil bearing materials, and so that the oil is ready for commercial use.

A suitable method for separating the two distinct layers is to pass the layered composition through a centrifuge. However, any device for separating the oil from the solvent may be used. Importantly, the oil will not have to be treated to remove the color, odor, or phospholipid constituents, and will not have to be further treated to separate the solvent from the oil. As such, the oil is ready for commercial edible oil uses such as vegetable oil sold on grocery store shelves or for use in frying of foods.

The finished oil will be comprised of greater than 95% by weight triglycerides and other non-polar constituents, and more preferably 99% by weight triglycerides and other non-polar constituents, and less than 0.5% by weight phospholipids, 0.5% by weight pigments, and less than 0.5% by weight odoriferous components. Additionally, the oil is readily suitable for use in commercial food applications.

These examples are for illustrative purposes only, and are not meant to limit the claims in any way.

EXAMPLES

Example 1

An amount of hexane was blended with an amount of hydrofluorocarbon so that, specifically, 1,1,1,2,3,4,4,5,5—5-decafluoropentane, the finished solvent was comprised of 65% by volume hydrofluorocarbon. The hydrofluorocarbon (HFC) was sold under the tradename Vertrel XF®, by DuPont Fluorochemicals. After formation of the solvent, 100 grams of flaked soybeans were placed in a 10-foot long screw type auger set at a 30° angle. The soybeans were dimensioned to resemble a flake so that they had a length of about 10 mm and a thickness of less than 1 mm. The solvent was added so that it flowed downhill, over the flaked soybean material, which was heated to 35° C., while the auger turned at approximately 5 rpm to cause the soybean material to move in a direction opposite the solvent. The temperature in the screw type auger was maintained at 35° C. Once the solvent passed over the flaked soybeans, a solvent and oil mixture was formed that was separated from the soybean material. The miscella was then cooled to 20° C. to lower the oil solubility and form distinct solvent and oil layers. The oil was separated from the solvent and the oil was then analyzed.

The experiment was repeated except only hexane was used to extract the oil. The use of hexane only comports with a traditional procedure. The hexane only extraction was then repeated and followed by a traditional refining method to separate the triglycerides from pigment, phospholipid, and odoriferous constituents. The results of the three extractions are listed below:

| | Hexane Extracted Crude Oil | HFC/Hexane Extracted Crude Oil | Hexane Extracted Refined Oil |
|---|---|---|---|
| Triglyceride | 95–97 | >99 | >99 |
| Phosphatides | 1.5–2.5 | <0.01 | 0.003–0.045 |
| Unsaponifiable Matter | 1.6 | <0.3 | 0.3 |
| Plant Sterols | 0.33 | N/A | 0.13 |
| Tocopherols | 0.15–0.21 | 0.17 | 0.11–0.18 |
| Hydrocarbons (squalene) | 0.014 | N/A | 0.01 |
| Free Fatty Acid | 0.3–0.7 | <0.05 | <0.05 |
| Trace Metals | | | |
| Iron (ppm) | 1–3 | N/A | 0.1–0.3 |
| Copper (ppm) | 0.03–0.05 | N/A | 0.02–0.06 |

*N/A Not Analyzed

As can be seen, the solvent comprised of an HFC and hydrocarbon collectively extracted an oil that was comprised of greater than 99% by weight triglycerides. Further, as can be seen, the oil did not have significant amounts of other constituents which are considered undesirable in most food oil applications. The extraction results using the HFC/hydrocarbon solvent compared to traditional methods for extracting oil using hexane followed by distillation. Thus, the results demonstrate that the solvent selectively extracts triglyceride rich oil.

Example 2

Efficiencies of oil extraction obtained with hexane and solvent mixture systems were compared in a set of experiments. The variables examined were: solvent composition, extraction period, extraction temperature, and sonication.

All experiments were carried out with soybean flakes. The flakes were immersed in the various extraction solvents contained in borosilicate glass extraction vessels. Extraction solvents were hexanes or mixtures of hexanes and decafluoropentane (DFP) in varied ratios. As shown in FIGS. 1 and 2, the first number listed is the percent hexane, the second number is the percent DFP. The various combinations of hexane and DFP are listed in FIGS. 1 and 2.

The extraction vessels were placed in a thermostated water bath at a selected temperature for set time periods, two (2) minutes in the case of the experiment listed in FIG. 1 and a total of ten (10) minutes in the sonication experiment listed in FIG. 2. In a set of experiments, the effect of ultrasound on extraction efficiency was also monitored by placing an ultrasound probe in the extraction vessel. At the end of the specified extraction time period, the extracted oil was separated gravimetrically and/or recovered from the solvent through distillation. The recovered oil was weighed and analyzed. Fatty acid composition of extracted oil was determined with a gas chromatograph after saponification and methylation steps. The results of the fatty acid analysis are listed in FIG. 3. The phospholipid content of the oil was determined with a calorimetric test procedure recommended by the Association of Official Agricultural Chemists (AOAC official method 949.07).

The results of extraction experiments are shown graphically in FIG. 1. The results show that the amount of oil extracted from soybean flakes using hexanes and DFP mixture of 40:60 or 35:75 ratios was fairly consistent (mean weight percent of 15.6) for the extraction temperature ranging between 25° C.–45° C. The average weight of oils extracted with hexane was approximately 19.3%. The weight differences (3.7%) in the oils extracted with only hexanes versus hexanes/DFP blended solvents represent the polar lipids (phospholipids and fatty acids) and other materials (pigments) remaining in the flakes due to the selective extraction by using hexane/DFP blend solvents. The percent of phospholipids extracted with the various solvents are shown in the following table:

Phospholipid content of extracted soybean oil (% wt./wt.)

| Hexanes | Hexane:DFP (40:60) | Hexane:DFP (35:65) | Hexane:DFP (30:70) |
|---|---|---|---|
| 2.8 | <0.1 | <0.1 | <0.1 |

The results of the oil extracted with the aid of sonication are shown in FIG. 2. Reduced extraction time and enhanced oil quantities were achieved with the use of sonication.

Fatty acid and phospholipid compositions of the soy oil extracted with different hexane/DFP blends are shown in FIG. 3 and Table 1, respectively. Triglyceride contents were not affected by the difference in the solvent blend. However, the phospholipid contents in the oil extracted with hexane/DFP mixtures were much lower (below detection limit) than the hexane extracted oil. As such, it was determined that a fluorocarbon and hexane solvent is preferred for use in extracting triglyceride rich oils.

Thus, there has been shown and described a novel solvent and method for extraction of an oil rich in triglycerides which fulfills all of the objects and advantages sought therefor. It will be apparent to those skilled in the art, however, that many changes, variations, modifications, and other uses and applications for the subject methods and compositions are possible, and also changes, variations, modifications, and other uses and applications which do not depart from the spirit and scope of the invention are deemed to be covered by the invention which is limited only by the claims which follow.

What is claimed is:

1. A method of using a fluorocarbon or chlorocarbon to extract oil from an oil bearing material, said method comprising:

(a) contacting the oil bearing material with an amount of a fluorocarbon or chlorocarbon solvent at a temperature ranging from 35° C. to 55° C. to form a miscella-, wherein said fluorocarbon or said chlorocarbon solvent is comprised of a hydrocarbon and said fluorocarbon or said chlorocarbon, with said fluorocarbon or said chlorocarbon added in an amount sufficient to cause said solvent to have a polarity equal to or less than 0;

(b) separating said miscella from the oil bearing material;

(c) cooling said miscella to a temperature sufficient to form distinct oil and solvent layers; and, (d) treating said layers so as to separate said oil from said solvent;

wherein said chlorocarbon is selected from compounds having the formula $C_nH_{(2n+2)-x}$ $Cl_x$, where n equals between 1–4, and x equals between 1–9.

2. The method of claim 1 wherein said fluorocarbon is selected from e group consisting of $C_nH_{(2n+2)-x}$ $F_x$, where n equals between 4–8 and x equals between 1–17; $C_nF_{(2n+2)}$, where n equals between 5–8; $C_nCl_{(2n+2)-x}F_x$, where n equal between 1–6 and x equals between 1–13; and $C_nH_{(2n+2)-(x+f)}$ $Cl_xF_f$, where n equals between 1–4, x equals between 1–9, and f equals between 1–9; and, wherein said chlorocarbon is selected from the group consisting of $CH_2Cl_2$, $C_2H_3Cl_3$, and $C_2HCl_3$.

3. The method of claim 1 wherein said fluorocarbon is a hydrofluorocarbon.

4. The method of claim 1 wherein said hydrocarbon is a hexane.

5. The method of claim 1 wherein said miscella is cooled to a temperature ranging between about 15° C. and about 25° C.

6. A method for extracting oil from an oil bearing material so as to form oil product comprised of greater than 95% triglycerides and other non-polar constituents, said method comprising:

(a) forming a solvent comprised of an amount of a low molecular weight hydrocarbon having a viscosity of less than 2.6 centipoise and a non-polar fluorocarbon or chlorocarbon, with said solvent having a polarity no greater than about 0 and a viscosity ranging between about 0.3 and about 2.6 centipoise;

(b) contacting said solvent with the oil bearing material at a temperature ranging from 35° C. to 55° C. for a time sufficient to extract an amount of oil found in the oil bearing material, thereby forming a miscella;

(c) separating said miscella from the oil bearing material;

(d) cooling said solvent and oil composition to a temperature sufficient to form distinct oil and solvent layers; and, (e) separating said oil from said solvent;

wherein said chlorocarbon is selected from compounds having the formula $C_nH_{(2n+2)-x}\ Cl_x$, where n equals between 1–4, and x equals between 1–9.

7. The method of claim 6 wherein said fluorocarbon is selected from e group consisting of $C_nH_{(2n+2)-x}\ F_x$, where n equals between 4–8 and x equals between 1–17; $C_nF_{(2n+2)}$, where n equals between 5–8; $C_nCl_{(2n+2)-x}F_x$, where n equals between 1–6 and x equals between 1–13; and $C_nH_{(2n+2)-(x+f)}\ Cl_xF_f$, where n equals between 1–4, x equals between 1–9, and f equals between 1–9; and, wherein said chlorocarbon is selected from the group consisting of $CH_2Cl_2$, $C_2H_3Cl_3$, and $C_2HCl_3$.

8. The method of claim 6 wherein said hydrocarbon is a hexane.

9. The method of claim 6 wherein the oil bearing materials are flaked soybeans.

10. The method of claim 6 wherein greater than 15% of the oil bearing material is extracted.

11. The method of claim 6 wherein said miscella is cooled to a temperature ranging between about 15° C. and about 25° C.

12. The method of claim 6 wherein said fluorocarbon is selected from the group consisting of hydrofluorocarbon, perfluorocarbon, and hydrochlorofluorocarbon.

13. A composition comprising (a) a solvent and (b) a triglyceride mixture;

wherein said triglyceride mixture is extracted from an oil bearing material by said solvent, and said triglyceride mixture comprising greater than 95% by weight triglycerides and other non-polar constituents;

wherein said solvent comprises i) an amount of a low molecular weight hydrocarbon having a viscosity of less than 2.6 centipoise; and ii) a fluorocarbon solvent or a chlorocarbon solvent, said solvent having a polarity no greater than about 0 and a viscosity ranging between about 0.3 centipoise and about 2.6 centipoise, and wherein said chlorocarbon is selected from compounds having the formula $C_nH_{(2n+2)-x}\ Cl_x$, where n equals between 1–4, and x equals between 1–9;

wherein said triglyceride mixture is present as miscella in said solvent at a temperature ranging between 35° C. to 55° C., and said triglyceride mixture and said solvent phase separate at a temperature ranging between about 15° C. and about 25° C. forming distinct solvent and oil layers that can be separated.

14. The composition of claim 13 wherein said fluorocarbon is selected from the group consisting of $C_nH_{(2n+2)-x}\ F_x$, where n equals between 4–8 and x equals between 1–17; $C_nF_{(2n+2)}$, where n equals between 5–8; $C_nCl_{(2n+2)-x}F_x$, where n equals between 1–6 and x equals between 1–13; and $C_nH_{(2n+2)-(x+f)}\ Cl_xF_f$, where n equals between 1–4, x equals between 1–9, and f equals between 1–9; and, wherein said chlorocarbon is selected from the group consisting of $CH_2Cl_2$, $C_2H_3Cl_3$, and $C_2HCl_3$.

* * * * *